US005465570A

United States Patent [19]
Szillat et al.

[11] Patent Number: 5,465,570
[45] Date of Patent: Nov. 14, 1995

[54] FUEL CONTROL SYSTEM FOR A STAGED COMBUSTOR

[75] Inventors: John C. Szillat; Nicola Laudadio, both of Rockville; Teresa Chin, Manchester, all of Conn.

[73] Assignee: United Technologies Corporation, Hartford, Conn.

[21] Appl. No.: 171,786

[22] Filed: Dec. 22, 1993

[51] Int. Cl.⁶ ................................................. F02C 9/28
[52] U.S. Cl. .................... 60/39.06; 60/39.281; 60/747
[58] Field of Search ............................... 60/39.02, 39.03, 60/39.06, 39.281, 243, 734, 741, 747

[56] References Cited

U.S. PATENT DOCUMENTS

| | | | |
|---|---|---|---|
| 4,134,259 | 1/1979 | Gardner et al. | 60/241 |
| 4,716,719 | 1/1988 | Takahashi et al. | 60/39.06 |
| 4,817,389 | 4/1989 | Holladay et al. | 60/739 |
| 4,817,389 | 4/1989 | Holladay et al. | 60/739 |
| 4,903,478 | 2/1990 | Seto et al. | 60/39.281 |
| 4,949,538 | 8/1990 | Iasillo et al. | 60/39.465 |
| 4,964,270 | 10/1990 | Taylor et al. | 60/39.094 |
| 5,054,280 | 10/1991 | Ishibashi et al. | 60/39.06 |
| 5,201,181 | 4/1993 | Ohmori et al. | 60/39.03 |
| 5,261,222 | 11/1993 | Napoli | 60/39.06 |
| 5,272,637 | 12/1993 | Urushidani et al. | 364/431.02 |
| 5,289,685 | 3/1994 | Hoffa | 60/739 |
| 5,303,541 | 4/1994 | Goff et al. | 60/39.03 |
| 5,321,949 | 6/1994 | Napoli et al. | 60/739 |
| 5,349,812 | 9/1994 | Taniguchi et al. | 60/747 |
| 5,361,576 | 11/1994 | Muller | 60/39.03 |

OTHER PUBLICATIONS

I. Segalman, R. G. McKinney, G. J. Sturgess and L- M. Huang, "Reduction of NOx by Fuel–Staging in Gas Turbine Engines—A Commitment to the Future" pp. 29-1—29-17.

*Primary Examiner*—Louis J. Casaregola

[57] ABSTRACT

A fuel control system for a gas turbine engine having a staged combustor includes apparatus and methods to operate the combustor during pilot operation, staged operation, and transition between the two modes of operation. Various construction details are developed which provide a fuel control having a switch with built in hysteresis for determining the transition points between operating modes. In one embodiment, the combustor is switched from pilot to staged operation at a thrust level greater than the thrust level at which the combustor is switched from staged to pilot operation. During transitions between operating modes, the changes in fuel flows are limited by a plurality of rate limits to prevent combustor fuel spikes and blow-outs from occurring. During engine starts, the fuel lines to the main combustor are pre-filled to provide responsiveness during the transition from pilot to staged operation.

13 Claims, 8 Drawing Sheets

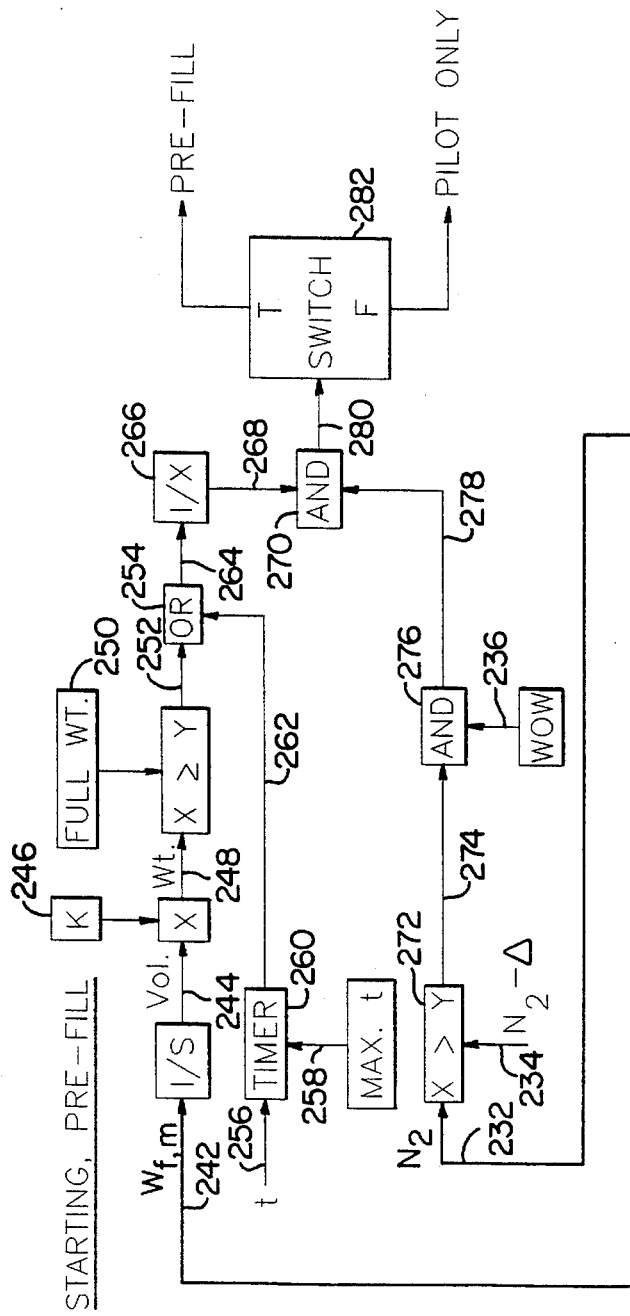
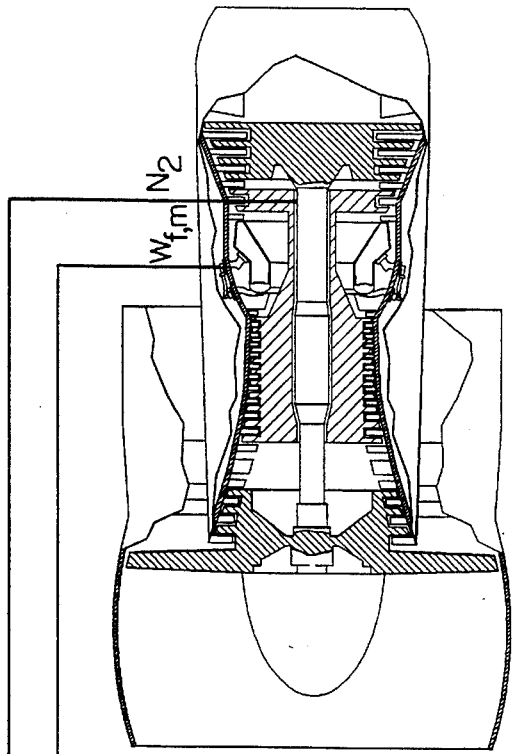
FIG. 9

FUEL CONTROL SYSTEM FOR A STAGED COMBUSTOR

TECHNICAL FIELD

This invention relates to gas turbine engines, and more particularly to a fuel control system for a gas turbine engine having a staged combustor.

Although the invention was developed in the field of aircraft engines, it has application to other fields where gas turbine engines having staged combustors may be used.

BACKGROUND OF THE INVENTION

A typical gas turbine engine includes a compressor section, a combustor and a turbine section. Working fluid flowing through the gas turbine engine is compressed in the compressor section to add energy to the working fluid. Most of the compressed working fluid exits the compressor section and enters the combustor. In the combustor, the working fluid is mixed with a supply of fuel and ignited. The products of combustion are then flowed through the turbine where energy is extracted from the working fluid. A portion of the extracted energy is transferred to the compressor section to compress incoming working fluid and the remainder may be used for other functions, such as thrust or shaft horsepower.

Gas turbine engines are required to function efficiently over a range of operating conditions. For a gas turbine engine used in aircraft applications and having a single stage combustor, low power operation corresponds to idle and high power operation corresponds to take-off, climb and cruise. At low power, fuel/air ratios are kept relatively low but above blow-out levels. Blow-out occurs when the fuel/air ratio within the combustor drops below a lean stability limit.

The combustion process generates numerous byproducts such as smoke particulate, unburned hydrocarbons, carbon monoxide, and oxide of nitrogen. Production of oxides of nitrogen increases as the operating temperature and residence time increase. Reducing the operating temperature may reduce the power output of the gas turbine engine. Reducing the residence time, defined as the amount of time the combustion mixture remains above a specific temperature, may result in less efficient combustion and higher production of carbon monoxide.

For environmental reasons, these byproducts are undesirable. In recent years, much of the research and development related to gas turbine engine combustion has focused on reducing the emission of such byproducts.

A significant development in gas turbine engine combustors has been the introduction of multiple stage combustors. A multiple stage combustor typically includes a pilot stage, a main stage, and possibly one or more intermediate stages. An example of such a combustor is disclosed in U.S. Pat. No. 4,265,615, issued to Lohmann et al and entitled "Fuel Injection System for Low Emission Burners".

At low power only the pilot stage is operated and the combustor is equivalent to a conventional single stage combustor. At high power the pilot stage and one or more of the other stages is operated. Having multiple stages reduces the residence time within each particular stage relative to having a single large combustion chamber. The lower residence time results in lower production of oxides of nitrogen. As a result of having multiple stages rather than a single stage, the emission of unwanted combustion byproducts is reduced.

A fuel control system for a multi-stage combustor must be responsive to the operator's demands and while maintaining efficient operation and ensuring the gas turbine engine is operated in a safe manner. Responsiveness of the combustor requires the fuel control to be able to supply the thrust demanded by the operator without undue delay. For multi-stage combustors, this also means that transitions between pilot only operation and staged operation should be smooth and prompt. Safety concerns are the avoidance of blow-outs and stalls. Blow-outs occur when the fuel to air ratio F/A within the combustor falls below the level needed to maintain combustion. Stall may occur if the combustor generates excessive back pressure on the compressor.

An example of a fuel control system for a multistage combustor is shown in U.S. Pat. No. 4,903,478, entitled "Dual Manifold Fuel System" and issued to Seto et al. This patent discloses a fuel system having two manifolds, one for each stage, and a shutoff valve between the fuel control and one of the manifolds. The shut-off valve opens and closes in response to a signal from a digital electronic engine computer. If the shut-off valve is open, fuel flows to both manifolds; if the shut-off valve is closed, fuel flows to only one manifold.

Another example is shown in U.S. Pat. No. 4,726,719, entitled "Method of and Apparatus for Controlling Fuel of Gas Turbine" and issued to Takahashi et al. This patent discloses a fuel control system in which the fuel control valve is controlled by a load control signal during normal operation and by a fuel flow rate signal during switches between single stage operation and two-stage operation. This patent also discloses using a predetermined time period during which the fuel control valve is controlled by the fuel flow rate signal.

The above art notwithstanding, scientists and engineers under the direction of Applicants' Assignee are working to develop effective and responsive fuel control systems for multi-stage combustors.

DISCLOSURE OF THE INVENTION

According to the present invention, a fuel control system for a multi-stage combustor includes switching means wherein the combustor is switched from pilot to staged operation at a higher thrust level than the thrust level at which the combustor is switched from staged to pilot. Further, a method of controlling a multi-stage combustor includes the steps of switching from pilot to staged at a first thrust indicative parameter and switching from staged to pilot at a second thrust indicative parameter, wherein the second thrust indicative parameter corresponds to a thrust level that is less that the thrust level indicated by the first thrust level indicative parameter. In a particular embodiment, the thrust level indicative parameter is a compressor exit temperature signal.

According to a further embodiment, a fuel control includes means to pre-fill the main fuel lines during the start-up of the gas turbine engine. Further, a method of starting a gas turbine engine having a multi-stage combustor includes a step of pre-filling the main fuel lines.

In a specific embodiment, the fuel control further includes means to calculate the volume of fuel sent to the main fuel lines during the pre-fill, compare the amount sent to the total volume of the main fuel lines, and terminate the pre-fill when the calculated volume exceeds the total volume. Further, a method of starting includes a step calculating the volume of the fuel sent to the main fuel lines, a step of comparing the calculated volume to a predetermined volume of the main fuel lines, and a step of terminating the prefill when the calculated volume exceeds the predetermined volume.

In another specific embodiment, the fuel control includes a timer having a predetermined period and terminating the prefill upon expiration of the predetermined period. Further, a method of starting includes starting a timer at the beginning of the prefill and terminating the prefill when the timer exceeds a predetermined period.

According to a still further embodiment, a fuel control includes means to ensure the filled status of the main lines while transitioning from pilot to staged operation. Further, a method of transitioning between pilot and staged operation includes a step of slowly diverting a portion of the pilot fuel to the main fuel lines while switching to staged operation.

A principle feature of the present invention is the hysteresis built into the fuel control system. A feature of another embodiment is the rate limiting of the pilot fuel flow during changes in the overall fuel flow, such as during transitions from low power to high power. An additional feature is the fill status check and the slow fill, of the main stage transition from pilot to staged operation.

A primary advantage of the present invention is the ability of the gas turbine engine to remain in a staged operation during periods of intermediate power. This ability results in the availability of full, staged power if needed. An advantage of another embodiment is the safety which results from rate limiting the pilot fuel flow during changes in the overall fuel flow. This feature helps to prevent combustor fuel spikes and blow-outs from occurring during variations in the fuel flow splits between the pilot stage and the main stage . An advantage of the further embodiments is the responsiveness which results from prefilling the main fuel lines during start-up and slow-filling transitions from pilot to staged operation. Prefilling during start-up ensures that the main fuel lines are substantially full when needed for staged operations. Slow filling during transitions from pilot to staged operation further ensures that any leakage of fuel in the main lines during pilot operations is accounted for.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 9 is a schematic representation of the prefill system for the dual stage combustor fuel control system.

BEST MODE FOR CARRYING OUT THE INVENTION

Figure 1:
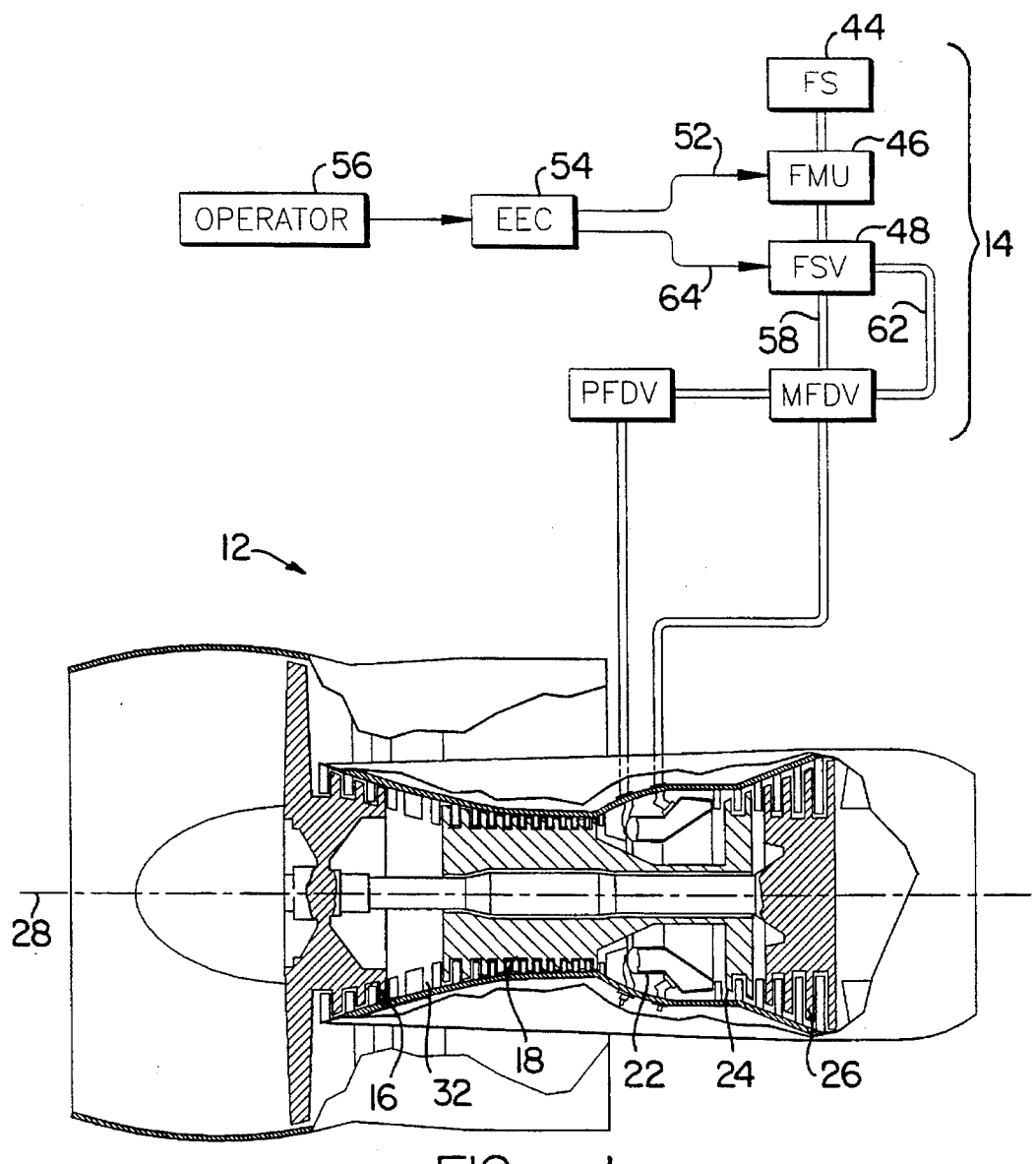
FIG. 1 is a sectional side view of a gas turbine engine having a staged combustor and includes a schematic diagram of a fuel supply system.

FIG. 1 illustrates a gas turbine engine 12 and includes a schematic drawing of a fuel supply system 14. The gas turbine engine includes a low pressure compressor 16, a high pressure compressor 18, a combustion section 22, a high pressure turbine 24, and a low pressure turbine 26. The gas turbine engine is disposed about a longitudinal axis 28 and includes an annular flowpath 32 disposed about the axis.

Figure 2:
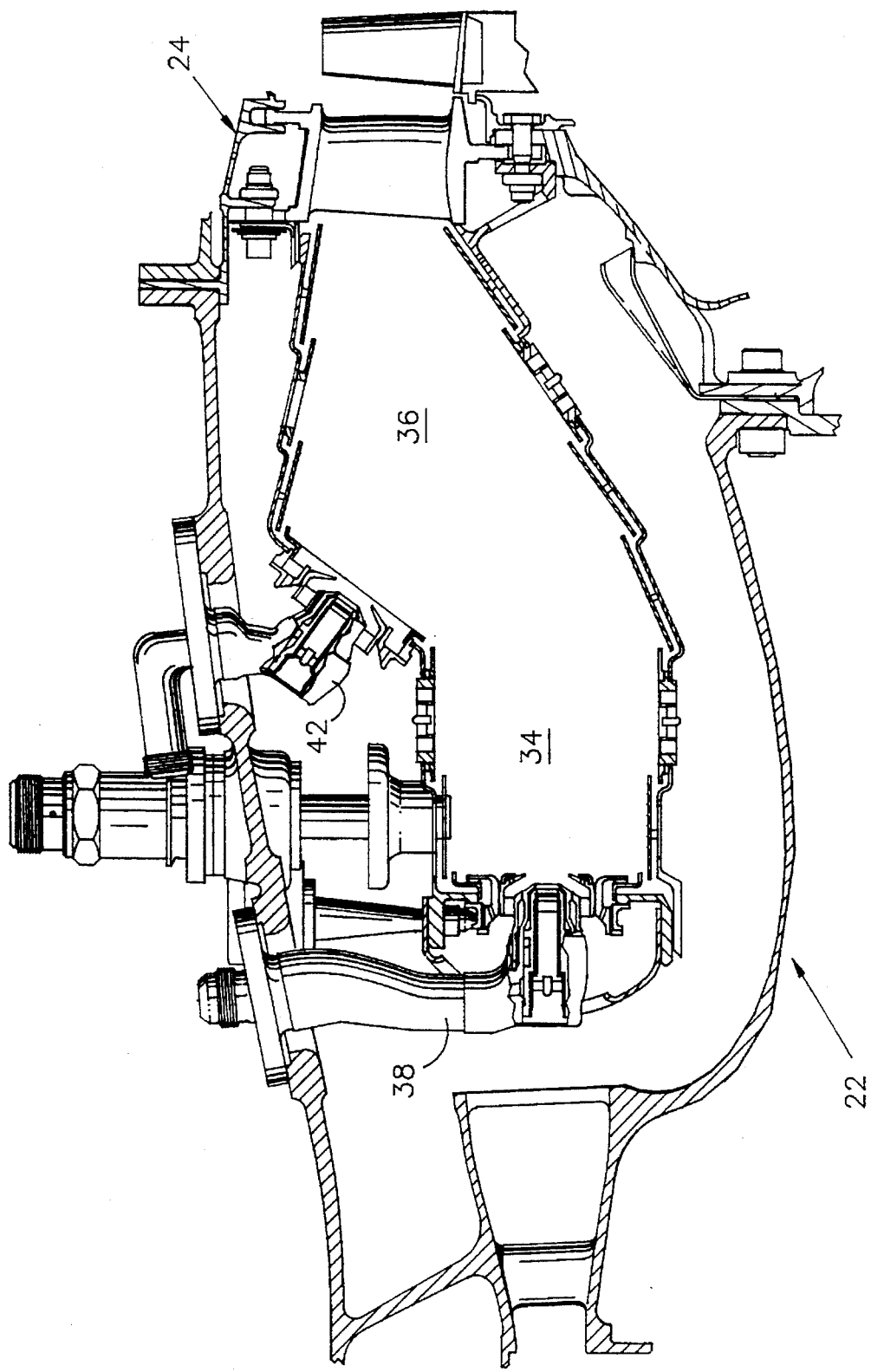
FIG. 2 is sectional side view of a dual stage combustor.

The combustion section is illustrated in more detail in FIG. 2. The combustion section is a staged combustor and includes a pilot combustion region 34 and a main combustion region 36. Fuel is fed to the pilot combustion region through a plurality of pilot fuel injectors 38 circumferentially spaced about the combustion section. Fuel is fed to the main combustion section through a plurality of main fuel injectors 42 circumferentially spaced about the combustor and spaced axially downstream and radially outward from the pilot fuel injectors.

The fuel supply system, as illustrated in FIG. 1, includes a fuel source 44 which is in fluid communication with a fuel metering unit 46. The fuel metering unit meters the flow to a fuel splitter valve 48 in response to a control signal 52 from a controller 54. The controller is typically an electronic engine control which responds to demands from an operator 56 of the engine. The fuel entering the fuel splitter valve is then proportioned between a main fuel line 58 and a pilot fuel line 62. The ratio of main fuel flow to pilot fuel flow is controlled by the fuel splitter valve in response to a second control signal 64 from the controller. Through control signals to the fuel metering unit and the fuel splitter valve, the controller determines the total fuel flow and the ratio of the fuel flow split between the main combustion section and the pilot combustion section.

Figure 3:
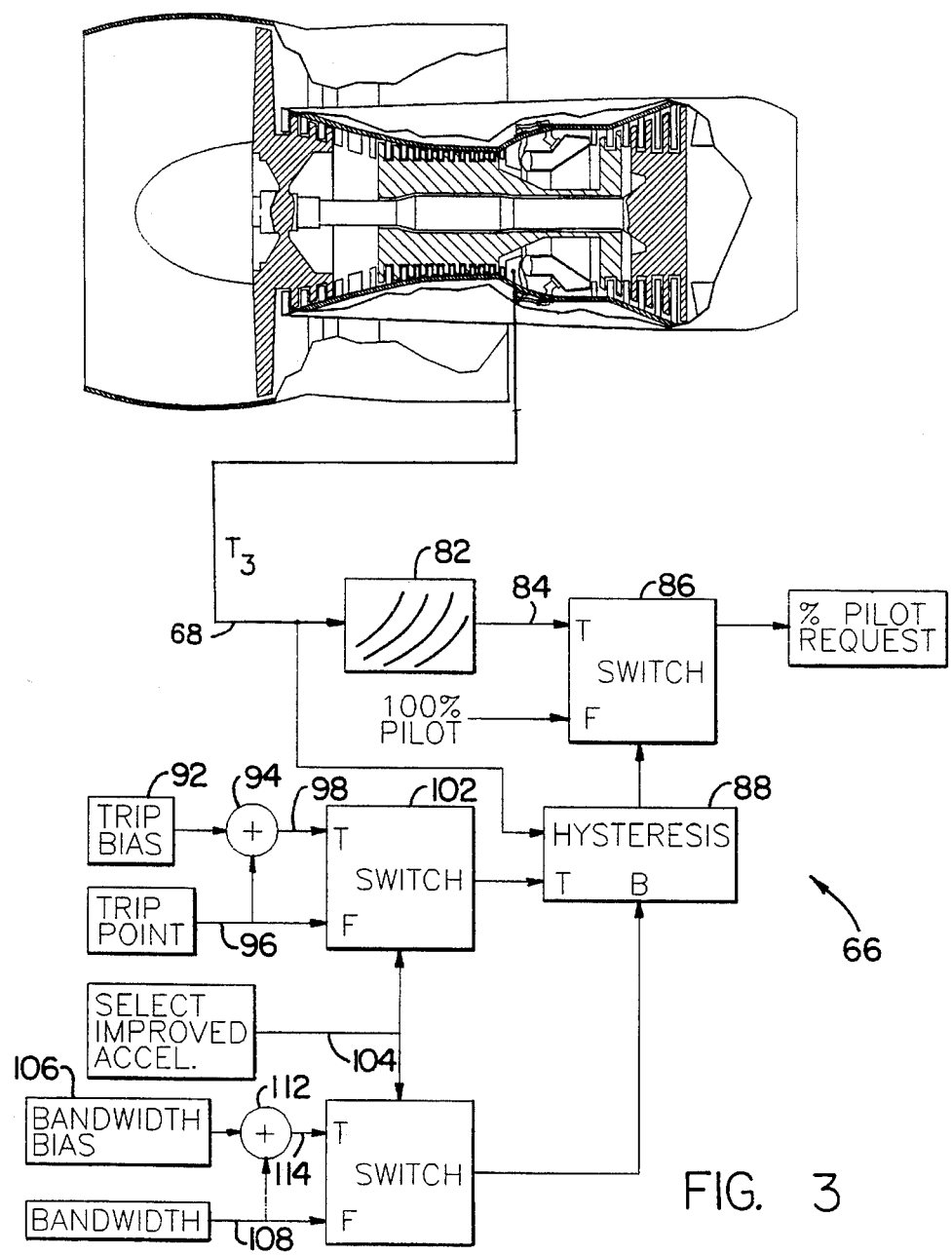
FIG. 3 is a schematic representation of a stage switching control toward the dual stage combustor.

Referring now to FIG. 3, a staged switching control system 66 for the dual stage combustor is illustrated. The Compressor exit temperature T3 is monitored to produce a thrust level indicative parameter. The compressor exit signal 68 is input to a schedule 82 which calculates the percentage pilot flow ($\%_{pilot}$) as a function of the thrust level. The percentage pilot flow signal 84 is then input to a switch 86. Compressor exit temperature is suggested as one of several thrust level indicative parameters. Other parameters, such as engine ratio units (ERU), defined as total fuel flow divided by burner pressure, may be used. Compressor exit temperature, however, is not as sensitive to combustor efficiency changes as ERU and is therefore a more reliable indicator of thrust level.

Figure 4:
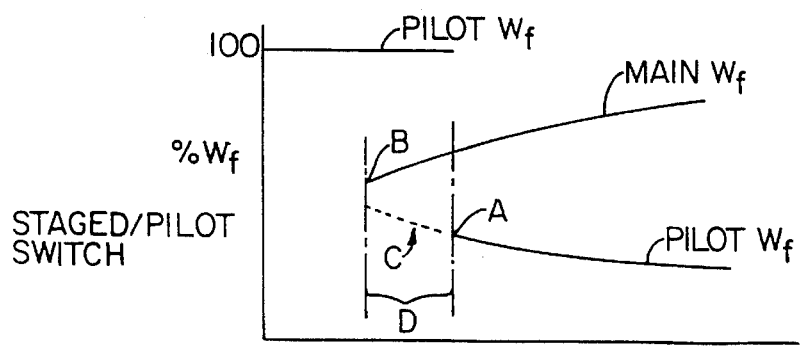
FIG. 4 is a graphic representation of the percentage pilot fuel flow $W_f$ commended to the gas turbine engine as a function of thrust indicative parameter, to show the hysteresis effect of a fuel control system for the dual stage combustor.

The thrust level signal is also input to a hysteresis function along with a trip point signal and a bandwidth signal. As illustrated in FIG. 4, the hysteresis function uses the trip point C and the bandwidth D, which is centered around the trip point, to determine a transition region for the fuel control system. For thrust levels less than the lower limit of the transition region (point B), the hysteresis function sends a signal to the switch indicating that the combustor is to be operated on the pilot region only. As a result, the switch outputs a signal indicating that 100% of the fuel flow should be flowing to the pilot combustor. For thrust levels above the upper limit of the transition region (point A), the hysteresis function sends a signal to the switch indicating that the combustor is to be operated in the staged mode. As a result, the switch outputs the percentage fuel flow request received from the schedule. For thrust level signals between points A and B, the hysteresis function sends a signal to the switch indicating that the combustor should remain in the present mode. Therefore, if the combustor is in the pilot mode it will remain in that mode as the thrust level increases from B to A, and if the combustor is in the staged mode it will remain in that mode as the thrust level decreases from A to B.

FIG. 3 also illustrates means to vary the trip point and bandwidth of the hysteresis function. This may be desirable in aircraft applications where the operator, during approach and descent of the aircraft, wants to ensure the availability of staged operation for maximum acceleration capabilities. This varying means includes a trip point bias signal 92 which is input to a summer 94 along with the trip point signal 96. The output 98 of the summer and the trip point signal are input to a switch 102. A select improved acceleration signal 104 is also input to the switch and provides an indication of whether the operator has selected the improved acceleration schedule. If improved acceleration has been selected, the switch will send the biased trip point signal to the hysteresis function. Similarly, a bandwidth bias signal 106 and the bandwidth signal 108 are input to a summer 112. The biased bandwidth signal 114 and the bandwidth signal are input to the switch. The switch also receives an input from the select improved acceleration signal and, in response to an indication that the operator has selected improved acceleration, the switch will output the modified bandwidth to the hysteresis function. The modified trip point and modified bandwidth will then be used to bias the hysteresis function to lower or higher thrust levels, as desired.

Figure 5:
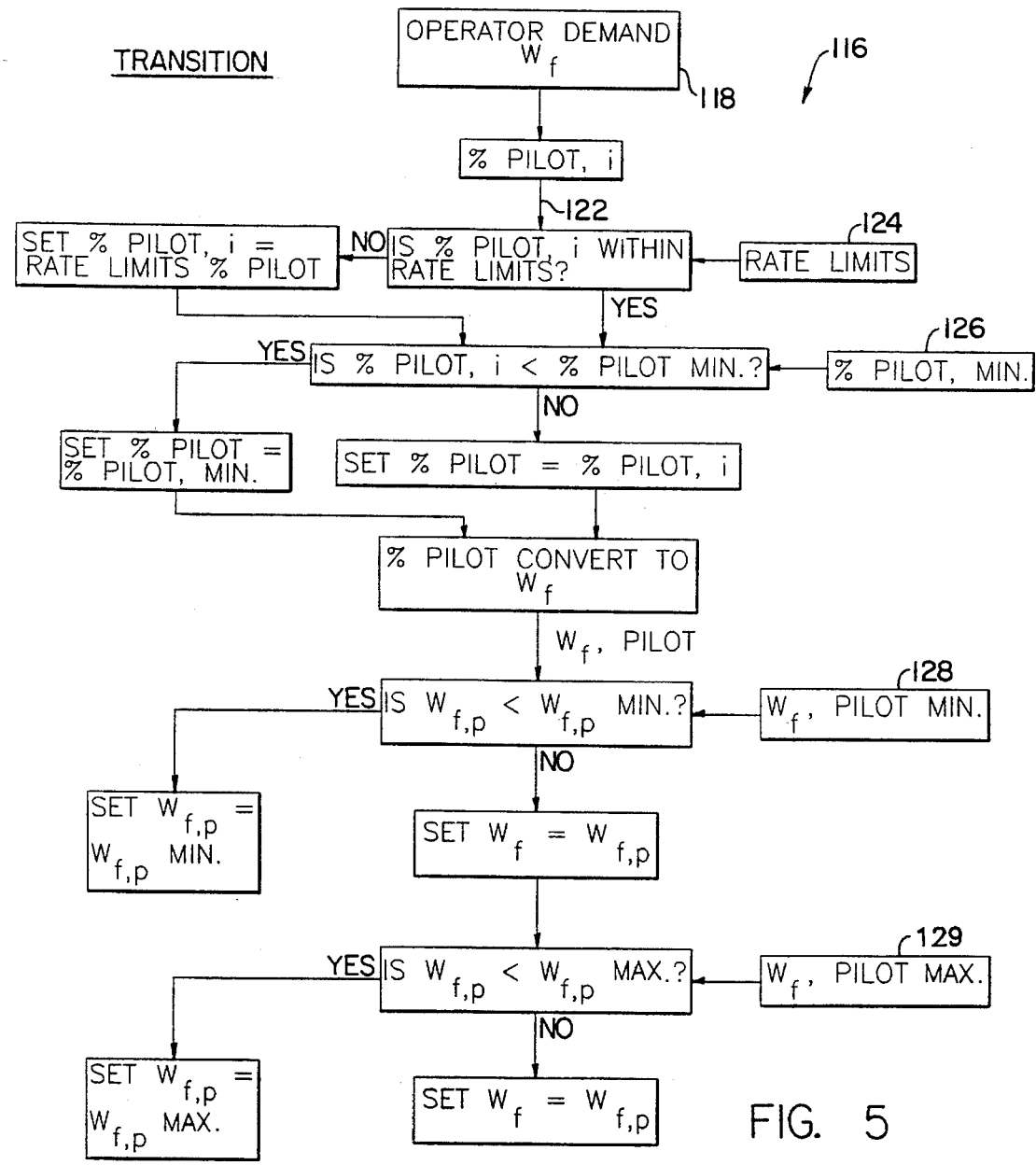
FIG. 5 is a functional block diagram of a fuel control system for the dual stage combustor.

Referring now to FIG. 5, a fuel control system 116 for the transition between pilot and staged operation and for the staged operation of the combustor is illustrated. An operator demand 118 for fuel flow is converted into a percentage pilot request 122, as illustrated in FIG. 3 and discussed previously. The percentage pilot request is then compared to one of a plurality of rate limits 124. The rate limits are used to limit the rate of change of the pilot fuel flow to ensure that the rate of fuel flow does not increase too quickly to the pilot combustor, which could cause a fuel spike to occur, or does not decrease too quickly, which could cause a blowout of the pilot combustor. If the change in the percentage pilot is within the rate limits, the percentage pilot request is outputted as the percentage pilot signal. If the change in percentage pilot exceeds the rate limits, a rate limited percentage pilot is outputted as the percentage pilot signal. The percentage pilot request is next compared to a minimum percentage pilot signal 126. If the percentage pilot signal is less than the minimum percentage pilot, the minimum percentage pilot is outputted as the percentage pilot signal to minimize the risk of a blowout. If the percentage pilot request is greater than the minimum percentage pilot, the percentage pilot request is output as the percentage pilot signal. The next step is to convert the percentage pilot signal to a pilot fuel flow signal and compare that to a minimum pilot fuel flow 128. This check ensures that minimum fuel flows, taking into account hardware considerations, are met. The final step is to compare the percentage pilot request to a maximum fuel flow $W_{f,max}$ signal 129. The maximum fuel flow check also accounts for hardware considerations. The lesser value of the two signals is then output as the pilot flow signal which is then sent to the fuel splitter valve.

Figure 6A:
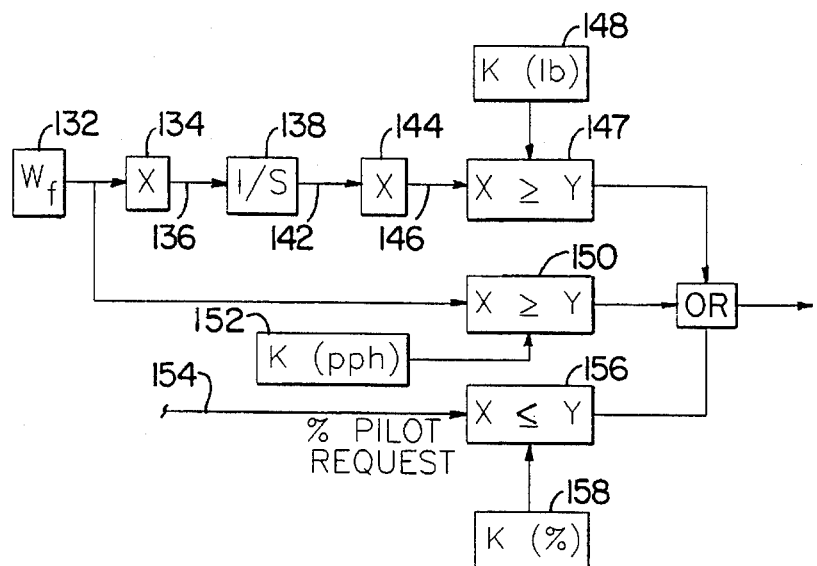
FIGS. 6a, b and c illustrate a flow rate limiting control system for the dual stage combustor fuel control system.

A detailed illustration of the application of the plurality of rate limits to the pilot fuel flow is shown in FIGS. 6a, b, and c. The specific rate limit applied to the pilot fuel flow request depends on the status of the combustor (pilot mode to staged mode transition, or staged mode to pilot mode transition) and the status of the main fuel lines (full or not full).

As shown in FIG. 6a, several checks are used to determine the fill status of the main fuel lines. First, the fuel flow to the main combustor 132 is input to a multiplier 134 which converts the signal to a volumetric fuel flow $W_{f(pph)}$ 136. The output of the multiplier is then input to an integrator 138 which converts the volumetric fuel flow to a volume fuel flow signal $W_f(in^3)$ 142. The volume fuel flow signal is then input to a multiplier 144 which converts the volume fuel flow signal to a mass fuel flow signal $W_f(1b.)$ 146. The mass fuel flow signal is then input to a comparison means 147 which compares it to the predetermined mass 148 of the full volume for the main fuel lines. The volume fuel flow signal is also input directly to a comparison means 150 and therein compared to a predetermined volume fuel flow rate level 152 that corresponds to full main fuel lines. As a final check, the percentage pilot request signal 154 is input to a comparison means 156 and compared to a predetermined percentage pilot signal 158 that also corresponds to full main fuel lines. If the main volume mass signal is greater than or equal to the predetermined mass signal, or the main volume fuel flow is greater than or equal to the predetermined main volume fuel flow, or the percentage pilot request is less than or equal to the predetermined percentage pilot, then a signal indicating that the main fuel lines are perceived full (FULL) is output. Otherwise, a signal indicating the main fuel lines are perceived not full (NOTFULL) is output.

Figure 6B:
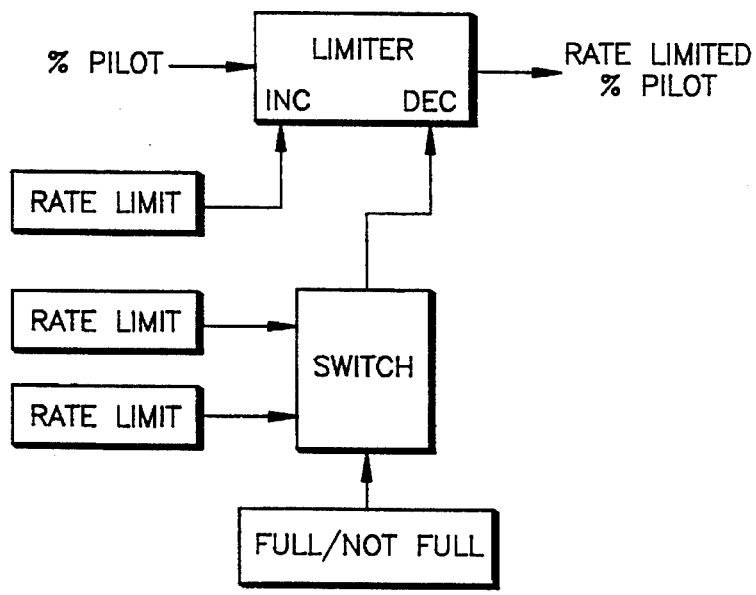
Figure 6C:
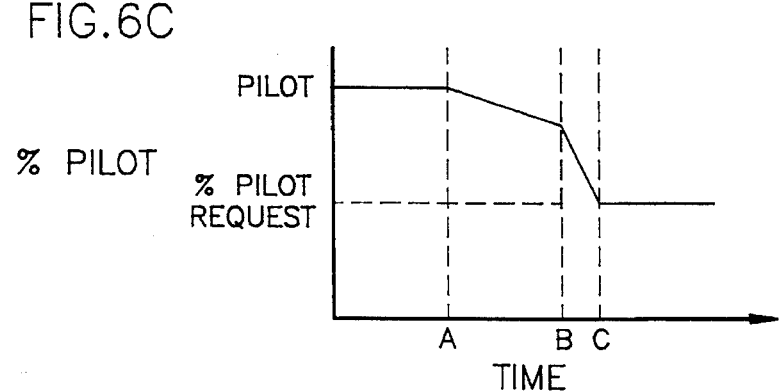

The determination of what rate limit is applied to the percentage pilot request is illustrated in FIG. 6b. The output from the main fuel line fill status check (see FIG. 6a) is input to switching means 160. The switching means 160 will output a first rate limit 162 if the main fuel lines are perceived as FULL and a second rate limit 164 if the main fuel lines are perceived as not full. The second rate limit is less than the first rate limit and corresponds to a slow fill of the main lines. Once the main lines are perceived as full, the second (faster) rate limit is applied to the percentage pilot request. The results for the transition from pilot to staged operation is illustrated in FIG. 6c. Point A corresponds to the time at which the request to transition from pilot to staged operation occurs. The percentage pilot is slowly decreased, due to application of the second rate limit, until the main lines are perceived as full (Point B). At that point the decrease in percentage pilot is more rapid until the requested percentage pilot is reached.

If the combustor is being transitioned from staged operation to pilot operation, a single rate limit is applied as shown in FIG. 6b. The output of the first switching means 160 and a third rate limit signal 166, corresponding to the rate limit to be applied if the percentage pilot is being increased, is input to a rate limiter 168. If the percentage pilot is being increased, the third rate limit is output. If the percentage pilot is being decreased, either the first or second rate limit is output depending on the fill status of the main fuel lines.

Figure 7:
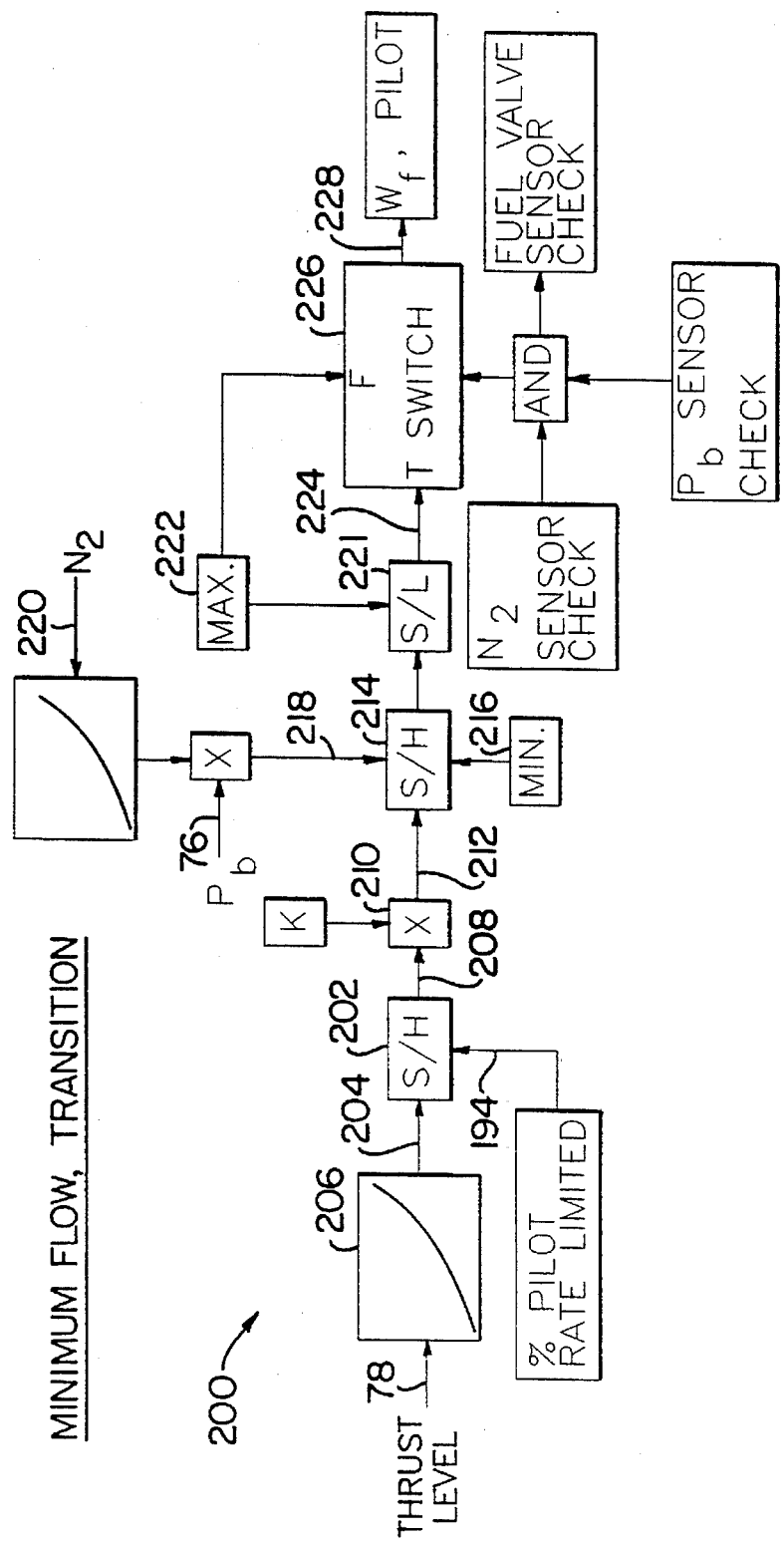
FIG. 7 is a schematic representation of a minimum/ maximum flow rate control system for the dual stage combustor fuel control system.

The means 200 to compare the rate limited percentage pilot request to minimum pilot fuel flows and maximum pilot fuel flows is illustrated in FIG. 7. The rate limited percentage pilot request 194, determined as discussed previously and disclosed in FIG. 6b, is input to a SELECT/ HIGHER function 202. The other input to the SELECT/ HIGHER function is a minimum percentage pilot signal 204 determined from a schedule function 206 which outputs minimum percentage pilot as a function of thrust level. The output 208 of the SELECT/HIGHER function is input to a multiplier 210 to convert the percentage pilot signal selected to a flow rate signal 212. The flow rate signal is then input to a second SELECT/HIGHER function 214 along with a predetermined minimum flow rate signal 216 and a calculated minimum flow rate signal 218 determined from a shaft speed signal 220 and the burner pressure signal. The output of the second SELECT/HIGHER function is then input to a SELECT/LOWER function 221 along with a predetermined maximum pilot fuel flow signal 222. The output 224 of the SELECT/LOWER function is then input to a switching means 226. The maximum pilot fuel flow signal is also input to the switching means. The output 228 of the switching means is dependent upon the validity of the shaft speed, burner pressure, and fuel valve sensors and signals. If all the sensors and signals are valid (indicating that the sensors used to determine thrust and fuel flow rate are operational), the switching means will output the SELECT/LOWER output. If any of the sensors or signals produce an invalid signal, the switching means will output the maximum pilot fuel flow rate.

Figure 8:
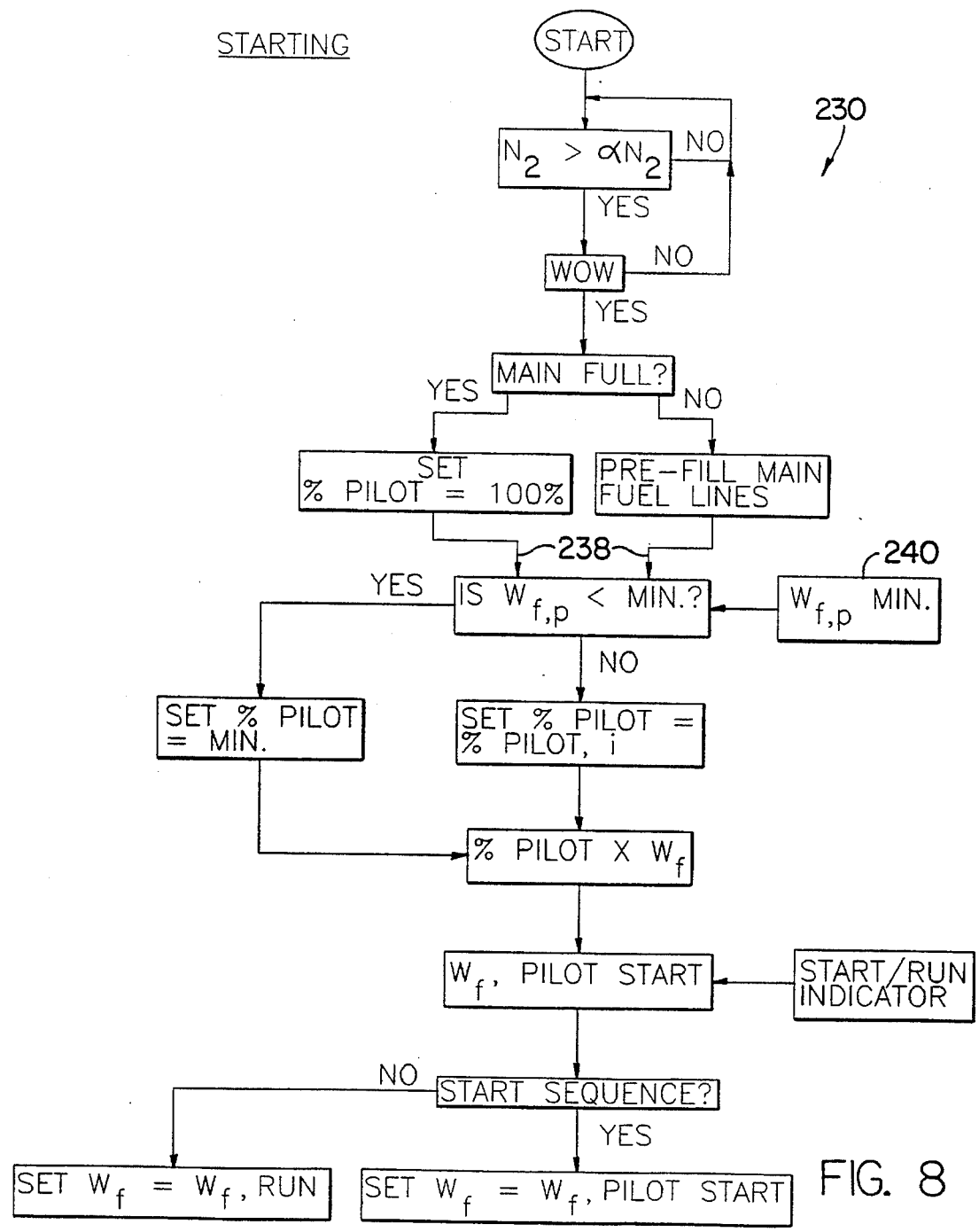
FIG. 8 is a functional block diagram of a starting control system for the dual stage combustor.

FIGS. 8 and 9 illustrate an engine starting control system 230 which provides means to prefill the main fuel lines during start up. The first step in the procedure is to compare the rotor shaft speed 232 to a predetermined amount 234 to ensure that the engine is within an acceptable operating speed to begin the prefill procedure. If the rotor shaft speed is at an acceptable level the next step is to check on the status of the aircraft itself. This is done by a sensor which indicates whether a load exits on the wheels of the aircraft, i.e. a "weight on wheels" signal (WOW) 236. If the rotor shaft speed is at an acceptable level and the weight on wheels sensor indicates the plane is on the ground, the next step is to check on the status of the main fuel lines. If the main fuel lines are not sensed as full the control system begins the prefill procedure which diverts a portion of the fuel flow from the pilot fuel lines to the main fuel lines until the main fuel lines are sensed as full.

Once the main fuel lines are perceived as full the percentage pilot fuel flow is set to 100%. The fuel flow Wf,p 238 to the pilot combustor, generated in the previous steps, is then checked against a minimum fuel flow 240 for the pilot combustor and the higher of the two values is selected. This value is then converted to fuel flow $W_f$ input to a switch which switches between a prefill sequence and start sequence.

A more detailed description of the logic used to switch between the prefill operation and the pilot only operation is shown in FIG. 9. The fill status of the main zone is checked by both a volumetric calculation and by a timer. In the volumetric calculation, the fuel flow into the main zone 242 is integrated to determine the volume of fuel flow to the main zone 244 and then multiplied by a constant 246 to convert the volume signal to a mass fuel flow signal 248 to the main zone. This mass fuel flow signal is compared to the corresponding weight of the fuel required to fill the main fuel lines 250. The output 252 of the comparison is then input to an "OR" function 254. The timing means involves inputting the amount of time elapsed since the start of the prefill operation 256 and the maximum amount of time necessary to fill the main fuel lines 258 into a timer 260 which compares the two values. The output of the timer 262 is also input to the OR function. The output of the OR function 264 is then input to the means for taking the inverse 266 and the inverse signal 268 is then input to an AND function 270.

The rotor shaft speed 232 is input to comparison means 272 where it is compared to a threshold rotor shaft speed 234. The output 274 of this comparison is input to an AND function 276. The other input to the AND function is the WOW signal 236. The output 278 of the second AND function is input to the first AND function 270. The output 280 of the first AND function is then input to a switching means 282 that switches between pilot only operation and starting or continuing the prefill procedure.

The operation of the logic is such that if either the rotor shaft speed is below the threshold level or the weight on wheels sensor indicates the plane is not on the ground, the prefill procedure will not be switched on. In addition, if either the volume calculation and/or the timer indicates that the main fuel lines are perceived as full, the prefill procedure will be switched off.

Although the invention has been shown and described with respect with exemplary embodiments thereof, it should be understood by those skilled in the art that various changes, omissions, and additions may be made thereto, without departing from the spirit and scope of the invention.

What is claimed is:

1. A method to operate a multi-stage combustor of a gas turbine engine, the gas turbine engine including a pilot combustor, a main combustor, and means to control the fuel flow $W_f$ to the combustor in response to demands from an operator, wherein the combustor has a pilot mode characterized by fuel flowing to the pilot combustor only and a staged mode characterized by fuel flowing to both the pilot combustor and the main combustor, the method including the steps of:

generating a thrust level indicative signal;

operating the combustor in the pilot mode with thrust level less than a first predetermined threshold;

switching from pilot mode to staged mode if the thrust level is greater than a second predetermined threshold with the combustor remaining in the pilot mode until the second predetermined threshold is reached; and switching from staged mode to pilot mode if thrust level is less than the first predetermined threshold with the combustor remaining in the staged mode until the first predetermined threshold is reached, and wherein the first predetermined threshold is less than the second predetermined threshold.

2. The method according to claim 1, further including the steps of:

generating a trip point signal;

generating a bandwidth signal;

generating the first predetermined threshold by adding the trip point signal and the bandwidth signal; and generating the second predetermined threshold by subtracting the bandwidth signal from the trip point signal.

3. The method according to claim 2, wherein the step of generating the first predetermined threshold includes the steps of:

generating a trip point bias signal;

summing the first predetermined threshold and the trip point bias signal to produce a biased threshold; and switching between the first predetermined threshold and the biased threshold in response to demands from the operator.

4. The method according to claim 2, wherein the step of generating the second predetermined threshold includes the steps of:

generating a trip point bias signal; and summing the second predetermined threshold and the trip point bias signal to produce a biased threshold; and switching between the first predetermined threshold and the biased threshold in response to demands from the operator.

5. The method according to claim 1, including the steps of:

sensing the fill status of the main combustor fuel lines, the status sensing means generating either a FULL signal or a NOTFULL signal; and reducing the fuel flow to the pilot combustor $W_{f,p}$ as a percentage of $W_f$ and flowing the remainder of fuel into the main lines if the status sensing means operates a NOTFULL signal.

6. The method according to claim 5, further including the steps of:

sensing the rotor speed $N_2$ of the gas turbine engine;

comparing $N_2$ to a prefill rotor speed $N_{2,prefill}$, wherein $N_{2,prefill} = N_{2,idle} - \text{DELTA}$, $N_{2,idle}$ being the idle rotor speed and DELTA being a predetermined value; and reducing the fuel flow to the pilot combustor $W_{f,p}$ as a percentage of $W_f$ if $N_2 > N_{2,prefill}$ signal and if the status sensing means generates a NOTFULL signal.

7. The method according to claim 5, wherein the step of sensing the fill status includes the steps of sensing the volume of flow to the main combustor, comparing the volume of flow to the total main fuel line volume, generating a FULL signal if the volume of flow is greater than or equal to the total main fuel line volume, and generating a NOTFULL signal otherwise.

8. The method according to claim 5, wherein the step of sensing the fill status includes the steps of starting a timer at the beginning of the reduction of fuel flow to the pilot combustor, generating a FULL signal if the timer exceeds a predetermined maximum allowable time, and generating a NOTFULL signal otherwise.

9. The method according to claim 5, wherein the step of reducing fuel flow includes the steps of comparing the target fuel flow to a first rate limit if a NOTFULL signal is generated and selecting the higher of the two signals.

10. The method according to claim 5, wherein the step of reducing fuel flow includes the steps of comparing the target fuel flow to a minimum pilot protection signal and selecting the higher of the two signals.

11. The method according to claim 5, wherein the step of reducing fuel flow includes the steps of comparing the target fuel flow to a maximum pilot protection signal and selecting the lower of the two signals.

12. The method according to claim 9, wherein the step of reducing fuel flow further includes the steps of comparing the target fuel flow to a second rate limit if a FULL signal is generated, wherein a derivative of the second rate limit has an absolute value greater than a derivative of the first rate limit, and selecting the higher of the two signals.

13. A fuel control for a multi-stage combustor of a gas turbine engine, the gas turbine engine including a pilot combustor, and a main combustor, the fuel control providing means to control the fuel flow $W_f$ to the combustor in response to demands from an operator, wherein the combustor has a pilot mode characterized by fuel flowing to the pilot combustor only and a staged mode characterized by fuel flowing to both the pilot combustor and the main combustor, the fuel control including:

means to generate a thrust level indicative signal;

means to operate the combustor in the pilot mode with thrust level less than a first predetermined threshold;

means to switch from pilot mode to staged mode if the thrust level is greater than a second predetermined threshold with the combustor remaining in the pilot mode until the second predetermined threshold is reached; and means to switch from staged mode to pilot mode if thrust level is less than the first predetermined threshold with the combustor remaining in the staged mode until the first predetermined threshold is reached, and wherein the first predetermined threshold is less than the second predetermined threshold.

* * * * *